United States Patent [19]

Blais

[11] 4,439,325
[45] Mar. 27, 1984

[54] PRESSURIZED FILTRATION SYSTEM

[75] Inventor: Norman J. Blais, Fiskdale, Mass.

[73] Assignee: CPC Engineering Corporation, Sturbirdge, Mass.

[21] Appl. No.: 512,774

[22] Filed: Jul. 11, 1983

Related U.S. Application Data

[63] Continuation-in-part of Ser. No. 405,910, Aug. 6, 1982, abandoned, which is a continuation of Ser. No. 214,523, Dec. 9, 1980, abandoned.

[51] Int. Cl.³ ............................................. B01D 25/12
[52] U.S. Cl. .................................. 210/740; 210/741; 210/746; 210/96.1; 210/103; 210/138; 210/224; 210/806
[58] Field of Search ............................... 210/740–746, 210/806, 96.1, 108, 143, 148, 149, 224, 225, 103, 138

[56] References Cited

U.S. PATENT DOCUMENTS

| 3,907,681 | 9/1975 | Corrigan et al. | 20/108 X |
| 4,187,175 | 2/1980 | Roberts et al. | 210/108 X |
| 4,226,714 | 10/1980 | Forness et al. | 210/96.1 |
| 4,370,232 | 1/1983 | Busse et al. | 210/224 |

Primary Examiner—John Adee
Attorney, Agent, or Firm—Eugene E. Geoffrey, Jr.

[57] ABSTRACT

A method and apparatus for controlling the operation of a primary filter press to insure the attainment of a desired quality cake in the press including a conduit for feeding a slurry or composition to the filter press, transducers responsive to the volume of slurry delivered to the filter press, the rate of flow, the pressure at the inlet to the press and the characteristics of the slurry solids for producing electric signals proportional thereto, relating at least certain of the signals to compute a quantity K indicative of the quality of the cake being formed in the press when the pressure to the filter press attains 90% of the terminal pressure and modifying the characteristics of the slurry to achieve the desired volume of K. The invention further comprehends the use of a pilot filter press of significantly smaller size than the primary press and fed by the same slurry and operated in the same manner. Since 90% of the terminal pressure in the pilot filter can be achieved in a very short time as compared with the primary press, the quantity K can be computed and adjusted long prior to the attainment of 90% of the terminal pressure in the primary filter press.

11 Claims, 9 Drawing Figures

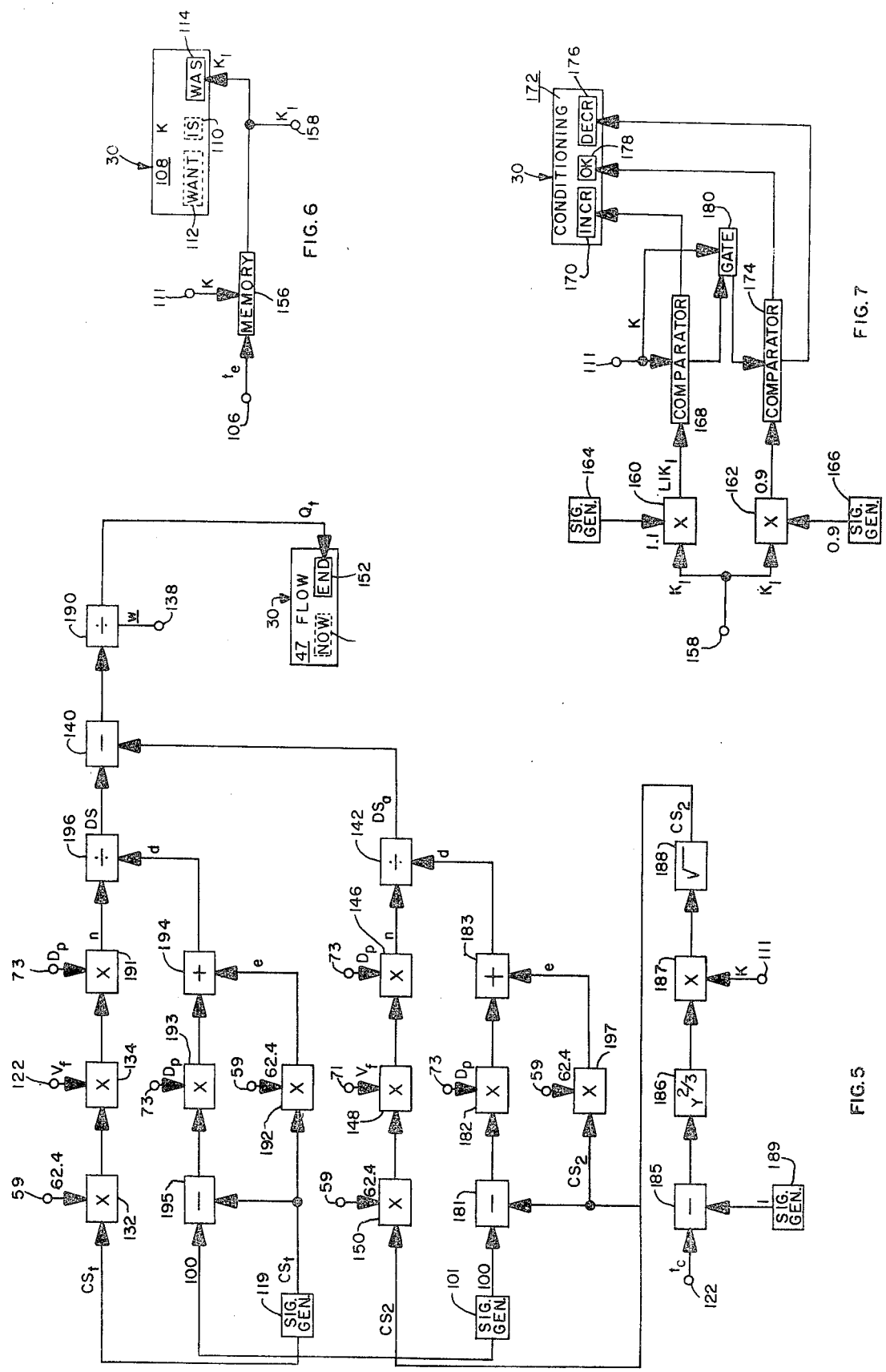

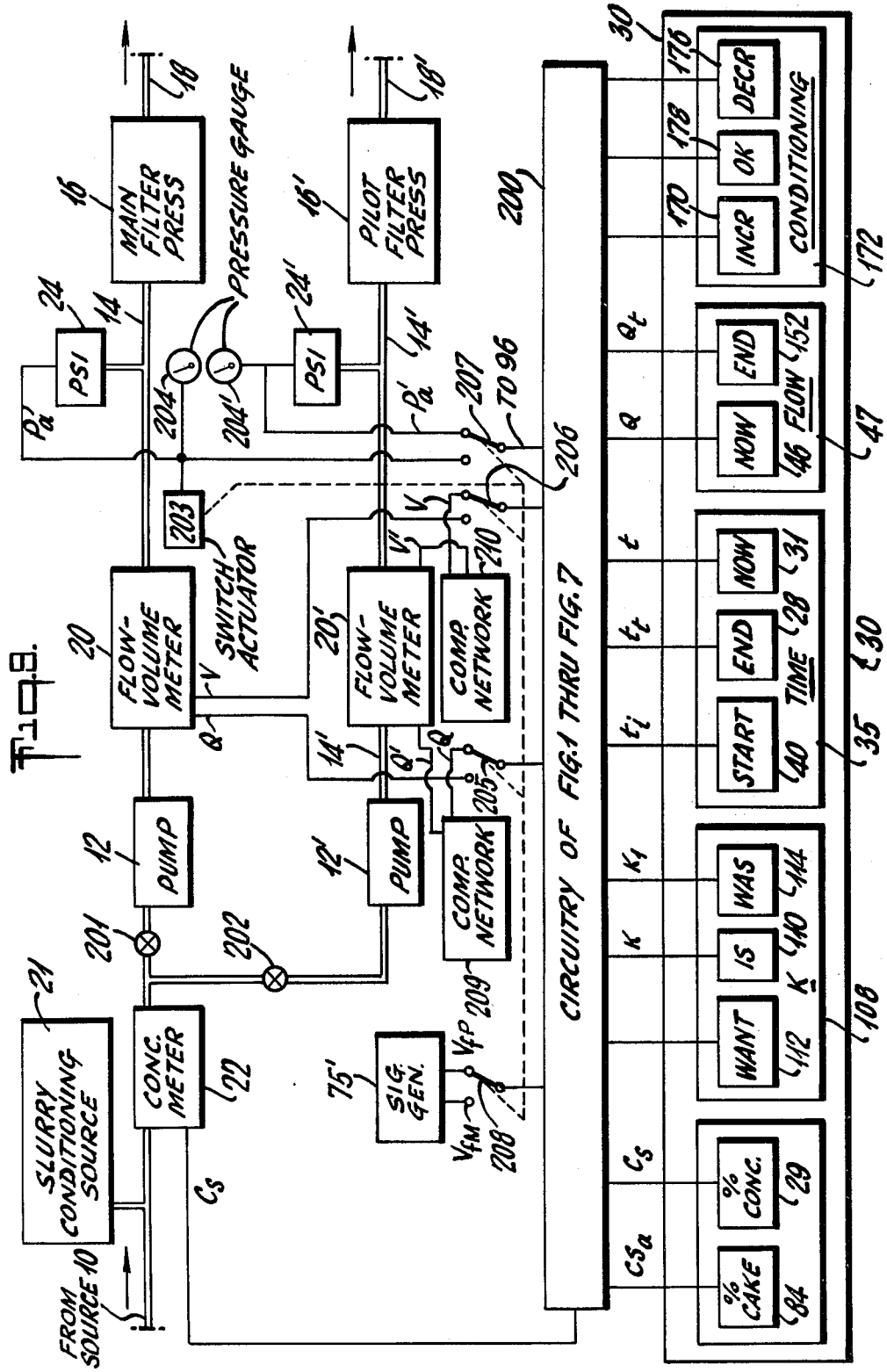

PRESSURIZED FILTRATION SYSTEM

This application is a continuation-in-part of U.S. application for patent Ser. No. 405,910 filed Aug. 6, 1982 entitled "Pressurized Filtration System" which is a continuation of U.S. application for patent Ser. No. 214,523 filed Dec. 9, 1980 entitled "Pressurized Filtration System" both now abandoned.

TECHNICAL FIELD

This invention relates to methods and apparatus for the operation of filter presses used for the separation of solids from liquids and particularly to systems wherein parameters of operation are generated for control of the operation of the system.

BACKGROUND ART

While filter presses are well known in the art, a major problem has persisted in that it has not been possible to determine, during the course of operation of the press, whether the operating conditions were satisfactory for the production of a desired cake within the filter and the preferred duration of the operating cycle. Thus, for example, if the liquid-solids composition or other operating conditions be incorrectly assessed or should change during the filtration process, the termination of a filtration cycle based on a normal cycle or a normal terminal filtrate flow may result in the production of unacceptably wet filter cake with the frequently attendant time-consuming task of washing the filter; or, termination of a filtration cycle based on a normal fitration time, or a normal terminal filtrate flow may result in plugging of the core or feedhole of the filter, which can result, among other things, in catastrophic failure of filter plates.

Historic methods of monitoring the progress of a filtration cycle comprise the discrete observation of pressure, elapsed time and filtrate flow. Unfortunately, these are useful only to the point that conditions remain constant from one filtration cycle to another. Discrete observations are totally misleading and useless as a basis for making process decisions where changes occur, for example, changes in concentration, permeability of the cake being formed or changes in response to the feed of conditioning chemicals.

One object of this invention therefore resides in the provision of filtration method and apparatus for the operation of a filter press wherein the problems referred to above have been overcome through the utilization of a novel and improved control system wherein operating conditions are continuously monitored to insure the production of a desired quality of cake and the termination time for the filtration cycle.

A still further object of the invention resides in the provision of a novel and improved method and apparatus for the operation of a filter press wherein a pilot filter press under control of an improved system for initially insuring attainment of a preferred quality of a cake produced in the filter and determining the duration of the operating cycle and thereafter transferring control to the main filter press thus insuring proper operation of the main filter press throughout the entire duration of the filtration cycle.

Still another object of the invention resides in the provision of a novel and improved method and apparatus for controlling the operation of a filter press.

DISCLOSURE OF THE INVENTION

In accordance with this invention, a filter press is provided with means for the production of electrical signals representative of volume V and the rate of flow Q through the filter of the system, concentration of the material $C_s$ being filtered, density of the particles of the material $D_p$ and elapsed time $t_e$ as a filtration cycle proceeds. Of these signals, the signals V, $C_s$, $D_p$ and $V_f$ (volume of the filter) are utilized to obtain a signal CS, representative of the percentage of cake solids existing in the filter during the course of operation. When the pressure in the system reaches a selected value, the signals $t_e$ and CS are utilized to calculate a signal K, indicative of the performance of the system.

The above and other objects and advantages of the invention will become apparent from the following description and accompanying drawings forming part of this application.

BRIEF DESCRIPTION OF THE DRAWINGS

FIGS. 2 through 7 are electrical schematic diagrams, each directed to the determination of a particular parameter and the provision of it as an output of the system;

FIG. 9 is a block diagram of a modified embodiment of the invention.

DETAILED DESCRIPTION OF THE INVENTION

Broadly the invention involves a control system for the operation of a filter press to insure the attainment of a cake of desired quality within the press and determine the length of the cycle of operation that will provide a cake which approximately fills the filter. These ends are attained with a press of known volume by measuring the volume of the slurry delivered to the press, the concentration of particulates contained in the slurry and the density of the particulates. Computing the percent of dry solids per unit mass of cake contained in the press, measuring the elapsed time of the filtering cycle and the pressure of the slurry and then computing a quantity K representing the rate at which liquid will permeate the cake being formed when the pressure is equal to at least 90% of the recommended terminal pressure of the filter. K is determined by the following equation:

$$K = CS^2 / t_e^x$$

where
  CS is the percent of dry solids per unit mass of cake in the press,
  $t_e$ is the elapsed time of the filter cycle and
  x is in the range of 0.54 to 0.8.

Experience with a given type of filter press will indicate the value of K required to achieve a cake of the desired quality in a particular time and the composition of the slurry during a particular filtering cycle is then modified to achieve the desired value of K. It has been found that K as measured during any given press cycle should preferably be between 0.9 and 1.1 of the predetermined K to achieve the desired cake quality in the desired length of cycle.

Figure 1:
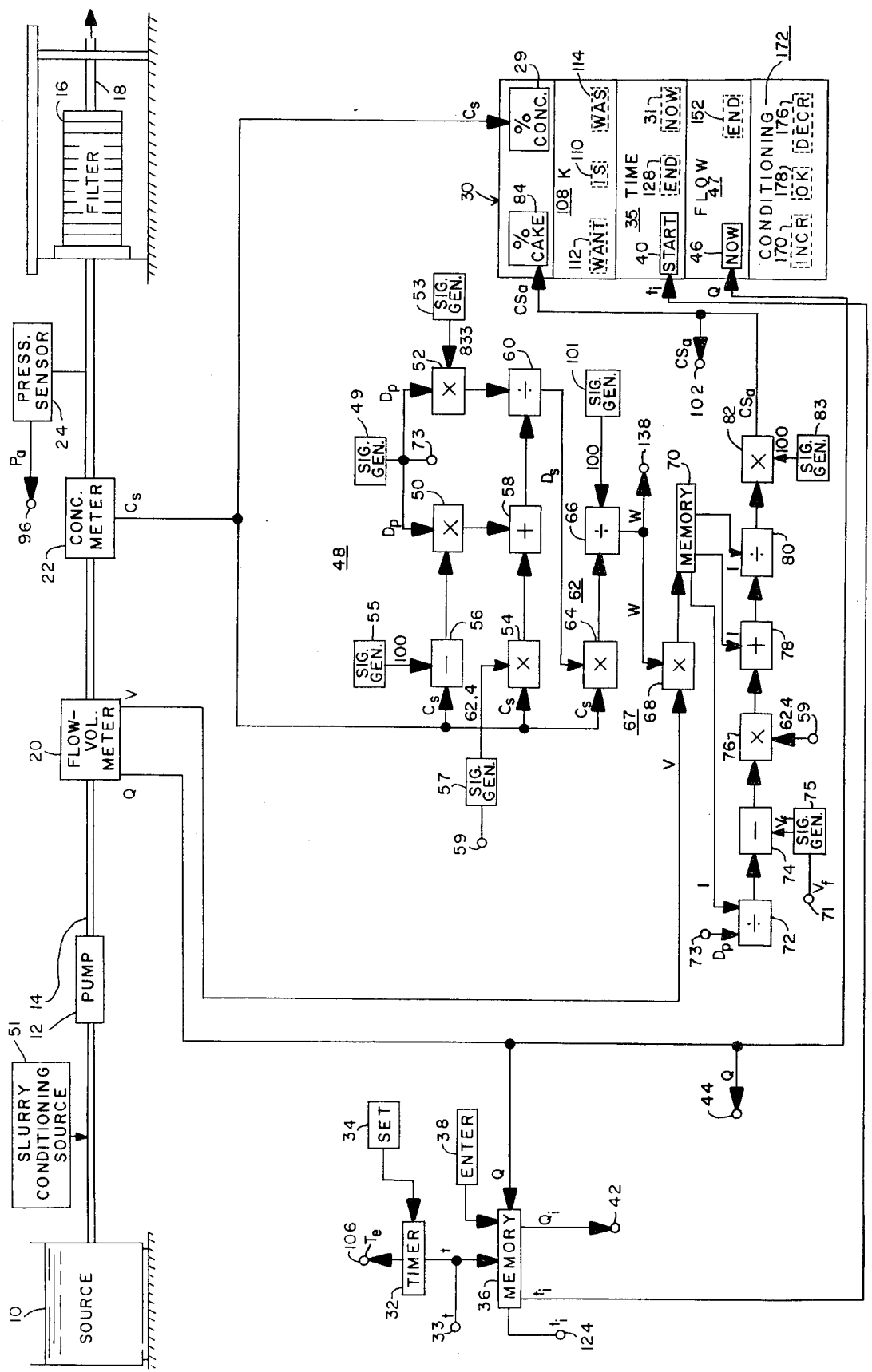
FIG. 1 is a schematic illustration of a basic portion of the system of this invention.

FIG. 1 generally illustrates a filtration system including a performance analyzer as contemplated by this invention, a display for indicating outputs of the analyzer and an initial portion of the circuitry of the analyzer. Source 10 represents a source of slurry, that is, a liquid having suspended in it certain solids to be filtered from the slurry. A typical example of such a slurry would be sludge resulting from the treatment of sewage. A pipe from source 10 is connected to pumping device 12, which then delivers the slurry through pipe 14 to a filter press 16 wherein the solids are trapped and the remaining liquid exits through pipe 18. It will be assumed, for the purposes of illustration, that at the commencement of a filtration cycle, filter 16 is empty and does not contain any filter cake.

Figure 2:
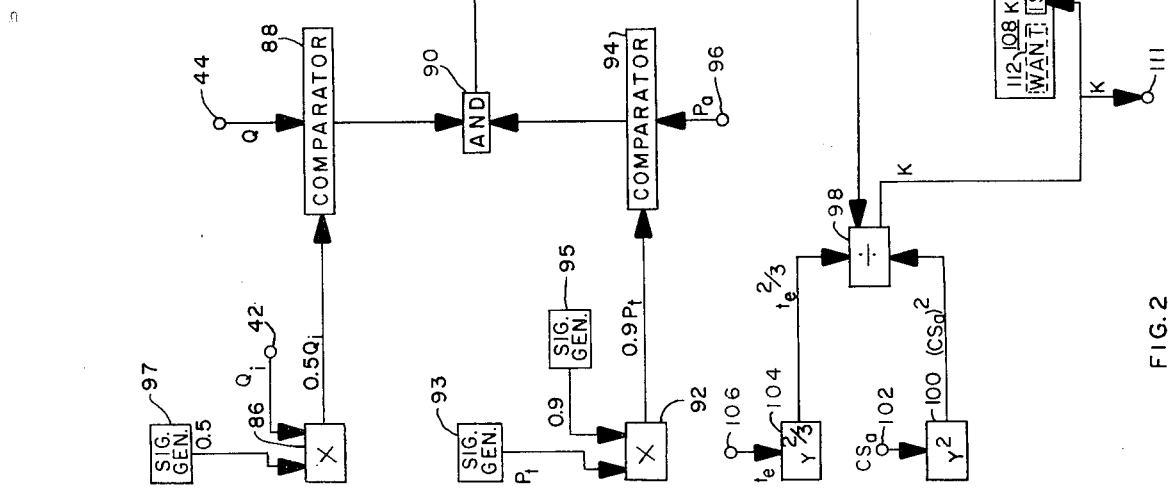

Flow-volume meter 20 is interposed in pipe 14 and provides two output signals, namely, a flow rate Q in gallons per minute, and an accumulated flow, that is, volume V in gallons. The concentration of solid matter in the slurry is monitored by a concentration meter 22 also interposed in pipe 14. It provides a signal $C_s$, representative of the percent concentration in terms of weight. The $C_s$ signal is supplied directly to "percent concentration" readout 29 on display 30 and to other circuitry of computer 48, as will be described. The pressure in pipe 14 is sensed by a pressure sensor 24, and it provides a signal output $P_a$ to terminal 96, representative of the pressure in pipe 14 in terms of pounds per square inch (PSI) for use as shown in FIG. 2. The density of the solid matter of the slurry is determined periodically, using known laboratory techniques, and this density is introduced, by means of an adjustable signal generator 49, as an indicationg signal $D_p$, representative of the density of solid matter in terms of pounds per cubic foot. As an example, $D_p$ may be determined by filtering a sample of the slurry and determining its dry weight and volume. Then, density would simply be determined by dividing its weight by its volume.

Display 30 includes several other readouts in addition to percent concentration and these will be discussed as the description proceeds.

Timer 32 provides two forms of outputs, namely, an output t on terminal 33 connected to the "now" readout 31 of TIME section 35 of display 30 and to memory 36, representative of real time and an output $t_e$ to terminal 106, representative of elapsed time from the time of application of a "set" input from set control 34, the latter being either a mechanical or electrical control connected to timer 32. Output $t_e$ is used as shown in FIG. 2.

Figure 4:
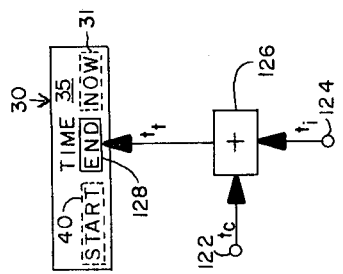

Memory 36 of FIG. 1 functions to store a time signal $t_i$, representative of the initiation time of a filtration cycle, and a flow rate signal $Q_i$, representing flow rate at the time of such initiation. A signal $t_i$ is obtained from the signal output t from timer 32 and the $Q_i$ signal is obtained from the Q signal output of flow meter 20, both being entered into memory 36 by the operation of enter control 38. The initial time signal $t_i$ is continuously supplied by memory 36 to "start" readout 40 of time section 35 of display 30, whereby the initiation time of a filtration cycle is constantly displayed. The $t_i$ signal is also supplied to terminal 124 where it is used as shown in FIG. 4. An initial flow rate signal $Q_i$ is fed to terminal 42 for use with other circuitry as will be described. A present flow signal Q from flow meter 20 is supplied directly to "now" readout 46 of flow section 47 of display 30. It also appears on terminal 44, where it is used as shown in FIG. 2.

Slurry conditioning source 21 is any suitable means for adding chemicals or other substances to the slurry in order to vary the composition or conditioning of the slurry as may be required to achieve the desired cake quality as discussed more fully under FIG. 7. Conditioning source 21 can be connected to the hydraulic line between source 10 and pump 12 (as shown) or at any other convenient location.

FIG. 1 further and particularly illustrates circuitry for the determination of "percent of cake" of solid matter, $CS_a$, accumulated in filter 16 during the filtration cycle. The first step in this determination is the computation of density of slurry, designated $D_s$. This is accomplished by $D_s$ computer 48, which includes multipliers 50, 52 and 54, difference or subtraction unit 56, adder 58, divider 60 and signal generators 49, 53, 55 and 57. It has been found that $D_s$ can be determined by these computational elements arranged as shown to solve the equation:

$$\text{Slurry Density } D_s = \frac{833 D_p}{D_p(100 - C_s) + 62.4 C_s}$$

where the terms of this equation are outputs of the measuring devices heretofore described or constants or selected values introduced through signal generators. Thus, a value $D_p$ (particle density) from signal generator 28 would be provided as a signal input to multipliers 50 and 52 and to terminal 73.

First, the signal value $D_p$ is multiplied in multiplier 52 by a signal value representing the density of the liquid phase of the slurry expressed in pounds per gallon times 100 (8.33×100 in the case of water at 70° F.) and this signal value is supplied by signal generator 53. Where the fluid is other than water, an appropriate substitution would be made.

Next, difference unit 56 subtracts a signal $C_s$, representative of percent concentration of the slurry as expressed by weight, from a signal representative of 100%, the 100 or 100% signal being supplied by signal generator 55. The difference signal is then multiplied by signal $D_p$ in multiplier 50, and the resultant product is added by adder 58 to a 62.4$C_s$ signal, this being obtained as an output of multiplier 54. The constant 62.4 represents the density of the liquid phase of the slurry expressed in pounds per cubic foot (62.4 pounds per cubic foot for water at 70° F.) as provided by signal generator 57, this constant also appearing on terminal 59 for use as noted later. If the fluid is other than water, the density constant would be that of the other fluid. The sum signal output of adder 58, $D_p(100 - C_s) + 62.4 C_s$ is then divided into the product output signal 833$D_p$ of multiplier 52 by divider 60 to provide a signal $D_s$, representative of the density of the slurry expressed in pounds per gallon of slurry.

Next, using the signal value $D_s$, a signal value w, representing weight of dry solids per unit of volume of slurry, is determined by computer 62. The signal $D_s$ is multiplied by a signal $C_s$ in multiplier 64 and the resulting product is divided in divider 66 by a signal representative of 100. The signal representative of 100 is provided by signal generator 101.

The final computation in this series is accomplished by $CS_a$ computer 67 which employs multiplier 68, memory 70, divider 72, subtraction unit 74, multiplier 76, adder 78, divider 80, multiplier 82 and signal generators 75 and 83. Initially, signal w is multiplied in multiplier 68 by a signal V, representing accumulated flow up to this point in the filtration cycle to provide an output 1, representative of the total weight of solids pumped so far into filter 16. As the value 1 is employed at succeeding steps in the computation of $CS_a$, memory 70 includes means for periodically sampling, at a selected rate, the 1 output of multiplier 68 and storing it for a sufficient period to complete the computations shown. In the first calculation, the total weight of solids 1 is divided by a signal from terminal 73, representing particle density $D_p$ obtained as described previously resulting in a signal representative of the volume of solids in filter 16. This volume of solids signal is then subtracted from a reference signal $V_f$ from signal generator 75, representative of the volume of filter 16. The subtraction is accomplished by subtraction unit 74 resulting in an output representative of the volume of liquid in filter 16. The $V_f$ output from signal generator 75 also appears on terminal 71 where it is used as shown in FIG. 5. Next, the volume of liquid signal is multiplied in multiplier 76 by an output from terminal 59, representative of the density of the liquid phase of the slurry expressed in pounds per cubic foot (62.4 for water at 70° F., or other density constant where the liquid is other than water), resulting in an output of multiplier 76, representative of the weight of liquid in filter 16. Next, the weight of liquid signal from multiplier 76 is added in adder 78 to the weight of solids signal 1 from memory 70 and the sum represents the total weight of cake in filter 16. This total weight signal is next divided into the weight of solids signal 1 in divider 80 to provide an output, which is then multiplied by an output from signal generator 83, representative of 100%, to provide the signal $CS_a$, representative of actual percentage of dry cake solids in the filter. Signal $CS_a$ is transmitted to and displayed by "percentage of cake" readout 84 on display 30. The $CS_a$ signal also appears on terminal 102, where it is used as shown in FIG. 2. The quantity "percentage of cake" is significant in order to make the operator aware of the status of the filtration cycle and the condition of the forming cake in the filter at all times allowing intelligent decisions to be made, for example, should it become necessary for mechanical reasons to terminate the cycle prematurely.

FIG. 2 illustrates signal circuitry which combines with the circuitry shown in FIG. 1 to provide a signal which is representative of a new measurement parameter. It is designated K and is indicative of the rate at which liquid will permeate the cake being formed when the pressure is equal to at least 90% of the recommended terminal pressure on the filter press. Thus, K can be described as a "dewaterability coefficient" which involves permeability of the cake to a liquid of given viscosity.

Figure 8:
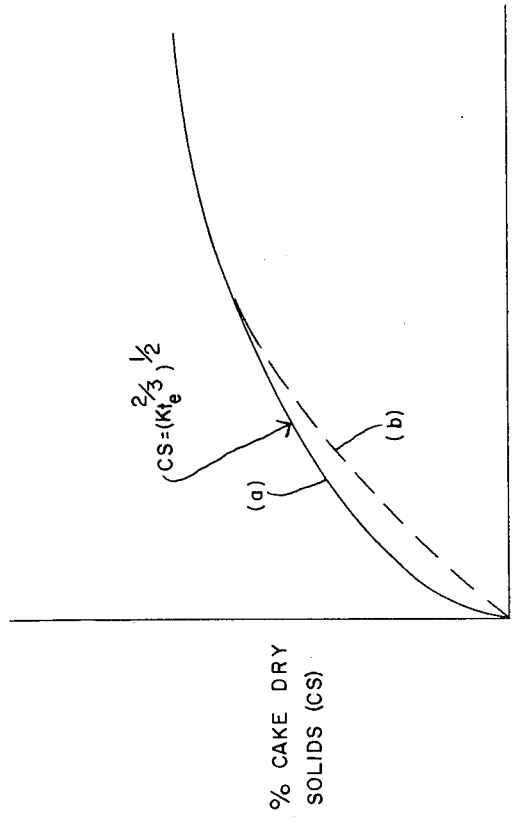
FIG. 8 is a graphical illustration of a feature of operation of the system of this invention.

FIG. 8 illustrates graphically the relation between the variables which determine K, the percent of dry cake solids (CS) and the elapsed filtration time ($t_e$), with the solid line a being representative of the relationship of these quantities as defined by the illustrated equation for the relation and the dashed line b being representative of them as operating parameters of a typical filtration system. The reason for the difference is that the equation is based upon filtration pressure being constant and as existing at the end of a filtration cycle. In practice, in order to generate such a pressure at the beginning of a filtration cycle, an inordinately high flow rate would be required. Since such rates cannot frequently be attained in the early phases of a cycle, solids buildup in the filter will lag behind those indicated by curve a during these phases. As the rate of buildup defined by curve a begins to drop, the actual pumping capability will begin to catch up and the curves will converge as shown. Beyond the point of convergence, the two curves will be synonymous and the filter will operate at a terminal pressure differential.

The circuitry of FIG. 2 determines a signal value K by solving the equation:

$$K = CS_a^2 / t_e^x$$

where x is in the range of 0.54 to 0.8 and preferably in the range of 0.6 to 0.75.

As shown, a signal $CS_a$ from terminal 102 of FIG. 1 is squared in squaring device 100 and is provided as a numerator to divider 98. A signal $t_e$ from terminal 106 of FIG. 1 is raised to the power x (such as $\frac{2}{3}$ for example) by computational element 104 and is fed as a denominator to divider 98. In order to insure that the criteria referred to above with respect to pressure is met, divider 98 is enabled only when the pressure signal as provided from pressure sensor 24 (see FIG. 1) indicates a near terminal pressure. The pressure criteria signal is generated as follows. Signal generator 93 provides a pressure signal $P_t$, representative of an anticipated operating pressure at the termination of a filtration cycle and it is supplied as an input to multiplier 92, where it is multiplied by a signal from signal generator 95, representative of the numeral 0.9. Thus, there is provided as an output of multiplier 92 a signal representative of $0.9P_t$, or, 90% of the anticipated terminal pressure. This quantity is then compared in comparator 94 with a current pressure signal $P_a$ from terminal 96, and there is provided an output from comparator 94 when current pressure exceeds the 90% figure and thus there would be present essentially terminal operating pressure in accordance with the dictates of the equation illustrated above. While the output of comparator 94 may be used directly as a gating or enabling signal to divider 98 to effect an output K when such pressure is achieved, a safeguard is provided to protect against triggering an output K response to an artificially created pressure value. Thus, for example, a valve might be accidentally closed downstream of pressure sensor 24 and creates an abnormally high pressure unrelated to filter operation. The safeguard involves sampling flow rate through pipe 14 and insert the requirement that there be at least one-half the rate of flow that existed at the commencement of the filtration cycle before the pressure output of comparator 94 is effective. This is achieved by providing a signal $Q_i$ from terminal 42 of FIG. 1, representative of the flow at the beginning of the filtration cycle, to multiplier 86, where it is multiplied by a signal from signal generator 94, representative of the numeral 0.5. The product of multiplier 86, $0.5Q_i$, is then fed as one input to comparator 88, together with a second input from terminal 44 of FIG. 1, representative of current flow Q. Comparator 88 then provides an output only when current flow is at least equal to 0.5 flow at the commencement of the filtration cycle. In accordance with the considerations discussed, the outputs of both comparators 88 and 94 are fed to AND gate 90 which, accordingly, provides a gating or enabling signal to divider 98 only when there is both near terminal pressure in the system and there is adequate flow through the system to provide assurance that there are no obstructions in the line. Under these circumstances, divider 98 is gated and the signal value, representative of K, is provided as an output on terminal 111 and is displayed by "is" readout 110 of the K section 108 of display 30. Additionally, the K section of the display includes a "want" readout 112 and a "was" readout 114. "Want" readout 112 may simply be a programmable display wherein a selected value is either electrically or mechanically inserted. "Was" readout 114 is activated as will be described with respect to FIG. 6.

Figure 3:
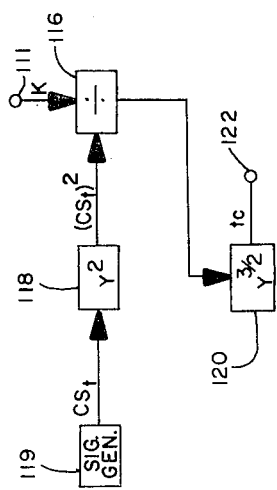

Referring to FIG. 3, signal K is employed in the determination of the predicted duration of a filtration cycle. This prediction may be made for selected values of percentage of cake solids ($CS_t$) desired or permissible at the end of a filtration cycle. The selected signal is obtained as an output of signal generator 119 and fed to squaring unit 118 and as $CS_t^2$ is supplied as the numerator of divider 116, wherein it is divided by signal K from terminal 111 of FIG. 2. The quotient output of divider 116 is raised to the z power by computational element 120 wherein z is in the range of 1.25 to 1.85 and preferably in the range of 1.33 to 1.66. The result is a signal $t_c$, representative of the length of a filtration cycle in minutes required to achieve a selected percentage of cake solids. This time signal is fed to terminal 122, and, as shown in FIG. 4, the signal is added in adder 126 to a signal $t_i$ from terminal 124 of FIG. 1, which is representative of the time of commencement of the current filtration cycle. The sum of these times, labelled $t_t$, is thus representative of the real time projected end of a filtration cycle, and as such is fed to and displayed on "end" readout 128 of TIME section 35 of display 30.

An additional parameter of value to an operator of a filtration system in accordance with the invention is the flow rate which will exist at the end of the filtration cycle. This can be determined by subtracting the weight of dry solids contained in the filter cake one minute before the termination of the cycle $DS_2$ from the weight of dry solids in the cake at the time of termination DS and dividing the result by the weight of dry solids per unit of volume w. The circuitry for accomplishing this is shown in FIG. 5.

As shown, a constant 1, as provided by signal generator 189, is subtracted from the signal representing the projected length of filtration cycle $t_c$, provided from terminal 122 of FIG. 3 by difference unit 185 resulting in signal $t_c-1$, representing the projected length of the filtration cycle minus one minute. Time $t_c-1$ is raised to the $\frac{2}{3}$ power by computational element 186 and is multiplied by K, as provided by terminal 111 of FIG. 2, by multiplier 187. The square root of this product is taken by computational unit 188 resulting in signal $CS_2$, representative of the percentage of dry solids in the filter cake at time $t_c-1$.

It has been found that the dry solids DS contained in a filter cake at any point can be determined by the equation:

$$DS = \frac{62.4 \ (CS) \ (V_f) \ (D_p)}{D_p(100-CS) + 62.4 \ CS}$$

where 62.4 represents the density of the liquid phase of the slurry in pounds per cubic foot.

Dry solids $DS_2$ at time $t_c-1$ is, therefore, determined as follows.

Cake percentage concentration $CS_2$ at time $t_c-1$ is multiplied by a signal value representing the density of the liquid phase of the slurry (62.4 in case of water at 70° F.) as provided by terminal 49 of FIG. 1 in multiplier 150. The product is then multiplied by a signal representing the volume of the filter $V_f$ (as provided by terminal 71 of FIG. 1) by multiplier 148. This product is then multiplied by a signal representing the density of the slurry particles $D_p$ (as provided from terminal 73 of FIG. 1) by multiplier 146, resulting in a signal n, representative of 62.4 ($CS_2$) ($V_f$) ($D_p$).

Cake percentage concentration $CS_2$ is also multiplied by a signal representative of the density of the liquid phase of the slurry (as provided by terminal 59 of FIG. 1) by multiplier 197, resulting in a signal e representative of 62.4 $CS_2$.

Cake concentration $CS_2$ is subtracted from a constant 100, provided by signal generator 101 by difference unit 181. The difference is multiplied by a signal representing particle density $D_p$ (as provided by terminal 73 of FIG. 1) by multiplier 182. This product is added to signal e by adder 183 resulting in a signal d, representative of $D_p$ (100−$CS_2$)+62.4 $CS_2$. This signal d is divided into signal n, described previously by divider 142, resulting in a signal $DS_2$, representative of the dry solids weight of the filter cake at time $t_c-1$.

Dry solids DS weight of the cake at the termination of the cycle, and thus after a corresponding elapsed time $t_c$, is determined as described previously for the determination of $DS_2$, using multipliers 132, 134, 191, 192, 193, adder 194, difference unit 195 and divider 196, except that desired cake percentage concentration at the end of the cycle $CS_t$, supplied by a selected output of signal generator 119, is used in place of percentage concentration one minute from cycle end $CS_2$. Thus, divider 196 provides an output DS, representative of dry solids weight of the cake at the end of the cycle.

Dry solids weight one minute before cycle end $DS_2$ is subtracted from dry solids weight at cycle end DS by difference unit 140, resulting in a signal representative of the weight of dry solids added during the last minute of flow. This is divided by signal value w, representing weight of dry solids per unit of slurry volume (provided by terminal 138 of FIG. 1) by divider 190, resulting in a signal representative of predicted flow rate $Q_t$ at the end of the filtration cycle. This signal is fed to and displayed by "end" readout 152 of FLOW section 47 of display 30. "Now" flow readout 46 of display 30 is activated, as previously described with respect to FIG. 1, to allow the operator to compare current flow rate with that which should exist at the end of the cycle.

FIG. 6 illustrates circuitry for displaying the value of K from a previous cycle which is stored in memory 156. Values of K are made available to memory 156 from terminal 111 of FIG. 2, and a discrete signal K is entered into memory 156 responsive to a selected elapsed time signal $t_e$, supplied memory 156 from terminal 106 of FIG. 1. Typically, the selected time signal for gating would be one which would be near or at the end of a filtration cycle. Thus, during a given filtration cycle, there would be stored in memory 156 a value of K from the last portion of the previous filtration cycle. Then, at the end of the current cycle, and upon the receipt of a selected elapsed time signal, the K input of memory 156 would again be gated and a new value of K would be inserted in memory 156 in place of the old value. In each instance, it would be displayed during the following cycle of filtration. It is designated $K_1$ and is fed to terminal 158 and is provided to and displayed by "was" readout 114, the K section 108 of display 30. As stated above, the K section of the display also includes "is"

display readout 110 and "want" readout 112. By the presence of the three readouts, "want", "is" and "was", an operator is quite fully advised as to the relation between current operating conditions, previous operating conditions and desired operating conditions.

In order to more fully provide an awareness on the part of an operator of operating trends which may assist him in the determination of equipment adjustments, departures from normal operating conditions are indicated by CONDITIONING section 172 of display 30. Accordingly, the circuitry of FIG. 7 measures departures of K from a selected range and the direction of departure. The range illustrated (it may differ) is ±10% from a $K_1$ value which is obtained from terminal 158 of FIG. 7, representative of the value of K prevailing at the end of the previous filtration cycle or some other selected value of $K_1$. The +10% reference signal is obtained by multiplier 160, which multiplies $K_1$ by a signal representative of the 1.1 from signal generator 164. The product is then compared in comparator 168 with a current value K from terminal 111 of FIG. 2. A −10% reference is obtained by multiplier 162, which multiplies signal $K_1$ by a 0.9 value signal from signal generator 166. The product of $0.9K_1$ is fed to one input of comparator 174. A second input to comparator 174 is provided by gate 180, which gates through to comparator 174 a current value of K when gate 180 is enabled by an output from comparator 168. Comparator 168 and 174 are identical, and each is connected to operate as follows.

Assuming that the signal applied on the left side terminal of comparator 168, in this case being a signal which is a function of $K_1$, is less than a signal applied at the top terminal, in this case a value of K, there will be an output on the right side terminal. In the event that the $K_1$ signal is greater than the K signal, then there will be an output from the lower terminal. Accordingly, assuming that the value K applied to comparator 168 is greater than $1.1K_1$, indicating that the value K represents an increase from a normal range, there is provided an output from comparator 168 to DECREASE readout 176 of the CONDITIONING section 172 of display 30. Assume next that a signal K is less than $1.1K_1$, there is an output on the lower terminal of comparator 168 to gate 180, which then gates through signal K to comparator 174. Next, assume that a $0.9K_1$ signal input to comparator 174 is less than K. This would, of course, mean that, in fact, the value of K is within the range of from $0.9K_1$ to $1.1K_1$, which would be deemed a normal operating range. In accordance with this condition and the logic described, there will be an output from the right side terminal of comparator 174 and this is provided (as shown) to the "OK" readout 178 of CONDITIONING section 172 of display 30 to indicate normal operation. If, however, the input to the $0.9K_1$ input to comparator 174 is of a greater value than K, as provided through gate 180, this below-normal operating range signal will be evidenced by an output signal on the lower side of comparator 174 and this signal will be applied to INCREASE readout 170 of CONDITIONING section 172 of display 30 to, accordingly, signal a lower-than-normal operating condition.

The system which has been described clearly provides for much improved monitoring of filtration processes. As a matter of fact, for the first time, operating personnel are actually provided significant data as to the status of a filter press on a moment-by-moment basis during the filtration cycle. Further, and beyond this, they are provided forecasts as to the time of termination of a cycle under actual or selected conditions of termination. From all this, effective control of the filtration process is now realizable.

It is pointed out above that the computation of K which is a significant factor in determining the rate at which liquid will permeate the cake and therefore the quality of the cake cannot be accomplished until the pressure of the slurry being fed to the filter press is equal to at least 90% of the recommended terminal pressure to the press. In the operation of large filter presses which may include as many as 150 sections each about 80″ square, it would be necessary to pump as much as 8,000–9,000 gallons per minute initially to achieve a pressure of about 200 PSI which would be 90% of a typical terminal pressure of 225 PSI. Normally, to produce a pressure in the filter of the order of 90% of the terminal pressure within a few minutes after initiation of the filter cycle would be impractical and extremely costly as a pump of inordinate size and capacity would be required. Therefore, at the start of the filtering cycle, the pressure will be quite low. As the filter cycle continues, the volume of slurry pumped will gradually decrease and the pressure will increase until a terminal pressure of typically 225 PSI is reached. This procedure can take as much as an hour to achieve terminal pressure or at least 90% thereof so that the quality of the cake being formed will not be known until 90% of the terminal pressure is achieved. Through the utilization of an arrangement as shown in FIG. 9, the need for a large pump is avoided and the value of K can be determined almost immediately with the result that the quality of cake being formed in the main filter will be known virtually from the start of the filtering operation.

It will be observed in FIG. 9 that a pilot press 16′ is operated in parallel with the main filter 16 and the pilot press may have a single chamber of the order of 6 inches in diameter. With the use of the small filter press, a relatively small pump or other suitable means may be employed as a flow of the order of only 10 gallons per minute would be required and a terminal pressure which may be typically 225 PSI could be achieved in 10 to 20 seconds. With such an arrangement, the pilot filter press could be started prior to or even at the time the main filter system is started so that the value of K can be known at the start of the main filter press or within 10 to 20 seconds thereafter.

For convenience, components of the pilot press system in FIG. 9 corresponding to components of the main filter system have been denoted by like primed numerals.

It will be observed that the basic components of the main filter press system correspond precisely with those shown in FIG. 1 except that the concentration meter 22 precedes the pump 12 and the output $C_s$ is fed to the block 200 containing the circuitry shown in FIGS. 1 through 7. The liquid conduit 14 leading from the concentration meter includes a control valve 201 preceding the main pump 12 and the by-pass conduit 14′ is coupled to the conduit 14 preceding valve 201 and it too may include a control valve 202. The valves 201 and 202 may be either manually or automatically operated.

As previously mentioned, the conduit 14 feeding the main filter press 16 further includes the flow-volume meter 20 and the pressure transducer 24. In addition, a pressure gauge 204 may be connected to the pressure line $P_a$ together with the switch actuator 203 which, as will be shown, actuates four switches 205, 206, 207 and 208 to switch the circuitry 200 from the pilot filter press 16' to the main filter press 16. As in the case of the main filter press, the line 14' feeding the pilot filter press includes in addition to the pump 12', a flow-volume meter 20', a pressure transducer 24' and a pressure gauge 204'.

The flow-volume meter 20' in the pilot filter press line 14' produces outputs of flow Q' and volume V' which are of a much lower magnitude than the corresponding outputs of flow-volume meter 20 and accordingly, appropriate compensating networks 209 and 210 may be connected in series with the outputs Q' and V' to convert the signals to approximate the magnitude of the signals Q and V.

The switches 205 through 208 are each single pole, double throw and are mechanically coupled one to the others and to the switch actuator 203, so that upon the attainment of at least 90% of the terminal pressure in the main filter press, the switches 205, 206, 207 and 208 will be actuated by the switch actuator 203 to shift the circuitry 200 from the pilot filter 16' to the main filter 16. In addition, it will be observed that the signal generator 75', which corresponds to the signal generator 75 previously described, includes two outputs one representative of the main filter volume $V_{fM}$ and the other representative of the pilot filter volume $V_{fP}$. Thus, the signal $V_{fP}$ is fed to the circuitry 200 when in the pilot filter mode and the signal $V_{fM}$ in the main filter mode. With this arrangement, the value of K will be known within 15 to 20 seconds after the start of the pilot filter and the characteristics of the slurry can be modified to achieve the desired value of K which will hold for the main filter press 16 as well as for the pilot filter press 16'. Thus, when the switches 205 through 208 are actuated to connect the circuitry 200 to the main filter 16, K will already be known and at most only slight changes in the slurry characteristics may be desirable to achieve a cake of the desired quality.

It is evident from the structure shown in FIG. 9 that even if both the main and pilot filter presses 16 and 16' are started simultaneously by opening both valves 201 and 202, a pressure equivalent to 90% of the terminal pressure of the pilot filter can be achieved within 10 to 20 seconds and therefore enable almost immediate computation of K and modification of the slurry to attain the desired value of K. In this way, a cake of the desired quality will be formed in the main filter virtually from the start of the main filter.

The structure shown in FIG. 9 utilizes the same electronic circuitry for both the pilot filter press as well as the main filter press and means for switching the electronic circuitry 200 for computation of K as well as other factors from the pilot filter press to the main filter press when the pressure to the main filter press attains 90% of the terminal pressure. It is evident however that independent electronic circuitry may be utilized for each of the main and pilot filter presses with independent display panels so that the operator can adjust the characteristics of the concentration or slurry which is simultaneously fed to both filter presses in order to attain the desired value of K for the pilot press by observing the pilot press display panel. Then when the pressure to the main filter press achieves 90% of the terminal pressure, the operator need only observe the display panel for the main filter press and make further adjustment of the concentration, if desired, to achieve the desired value of K.

While only certain embodiments of the invention have been illustrated and described, it is apparent that alterations, changes and modifications may be made without departing from the true scope and spirit of the invention.

What is claimed is:

1. Means for filtering a liquid-solids composition utilizing a cyclically operated filter press of a known volume having an inlet and outlet and a recommended terminal pressure of the composition fed to said inlet and determining the quality of the cake formed in said filter press comprising means for measuring the volume of the composition delivered to said filter press, the concentration of particulates contained in said composition and the density of said particulates, computing means for determining the percent of the dry solids CS per unit mass of cake contained in the volume of said filter press, means for measuring the elapsed time $t_e$ of the filtering cycle, means for measuring the pressure of composition fed to said filter, computing means for determining a quantity K representing the rate at which the liquid will permeate the cake being formed according to the following equation when said pressure is equal to at least 90% of the recommended terminal pressure:

$$K = CS^2 / t_e^x,$$

where $x = 0.54$ to $0.8$,
means for modifying the composition to achieve a value of K previously determined experimentally to effect the desired quality of cake in said filter and continuing the cycle of operation until the cake approximately fills said filter.

2. Means for filtering a liquid-solids composition utilizing a cyclically operated filter press according to claim 1 including a computer responsive to the value K and the desired percentage of cake solids in said filter press to determine the remaining time required for completion of the filtering cycle.

3. Means for filtering a liquid-solids composition utilizing a cyclically operated filter press according to claim 1 including first electronic signals producing means for producing electrical signals proportional to the volume of composition fed to said filter press, the concentration of particulates contained in said composition, the density of said particulates and the volume of the filter press, first signal processing means for processing the said electrical signals to produce an electric signal CS corresponding to the percentage of dry solids in said filter press at a discrete point in the filtering cycle, second electronic signal producing means for producing electrical signals proportional to pressure of said concentration fed to said filter press and the time elapsed since the start of the filtering cycle, second signal processing means operable when the last said means produces a signal corresponding to at least 90% of said terminal pressure for solving said equation to produce an electric signal corresponding to said value of K and means for displaying the last said value.

4. Means for filtering a liquid-solids composition utilizing a cyclically operated filter press according to claim 3 including means for producing an electric signal proportional to the rate of flow of said composition to said filter press as compared to said rate of flow at the start of said filtering cycle, the last said means inhibiting the operation of said second signal producing means until said rate of flow does not exceed 50% of the rate of flow at the start of said cycle.

5. Means for filtering a liquid-solids composition utilizing a cyclically operated filter press according to claim 4 including computing means for producing a signal representative of the flow rate of the slurry to said filter at the projected end of said filter cycle.

6. Means for filtering a liquid-solids composition utilizing a cyclically operated filter press according to claim 5 wherein said filter press is operated in successive cycles and includes means for storing the value of K during each preceding cycle for comparison with K for the successive cycle and means for producing a signal when the value of K differs from a preceding value by a predetermined amount.

7. Means for filtering a liquid-solids composition utilizing a cyclically operated filter press according to claim 6 including visual display means for displaying selected computed quantities relating to the operation of the filter press and the anticipated termination time of the filter cycle.

8. Means for filtering a liquid-solids composition utilizing a cyclically operated filter press according to claim 1 including a pilot filter press operated in conjunction with the first said press and having a volume which is a small fraction of the volume of the first said filter press, means for feeding the same composition to both said filter presses, said pilot press including means for measuring the volume of composition delivered to the pilot press, the concentration and density of the particulates and determining the percent dry solids CS per unit mass of cake contained in the volume of the pilot press, means for measuring the elapsed time $t_e$ of the pilot filtering cycle and the pressure of the composition fed to the pilot filter press, and means for determining said quantity K, said pilot press achieving 90% of its terminal pressure within a fraction of the time required for the first said filter press whereby adjustment of the composition to provide a desired quantity K for the pilot filter press insures the formation of a desired cake in the first said press long prior to the attainment of 90% of the terminal pressure of the first said press.

9. Means for filtering a liquid-solids composition utilizing a cyclically operated filter press according to claim 8 wherein said pilot filter includes first electronic signal producing means for producing electrical signals proportional to the volume of composition fed to said filter press, the concentration of particulates contained in said composition, the density of said particulates and the volume of the filter press, first signal processing means for processing the said electrical signals to produce an electric signal CS corresponding to the percentage of dry solids in said filter press at a discrete point in the filtering cycle, second electronic signal producing means for producing electrical signals proportional to pressure of said concentration fed to said filter press and the time elapsed since the start of the filtering cycle, second signal processing means operable when the last said means produces a signal corresponding to at least 90% of said terminal pressure for solving said equation to produce an electrical signal corresponding to said value of K and means for displaying the last said value.

10. Means for filtering a liquid-solids composition utilizing a cyclically operated filter press according to claim 3 including a pilot filter press having a volume which is a small fraction of the volume of the first said filter press and operated in conjunction with the first said filter press, conduit means for feeding the same composition to both said filter presses, said pilot filter press including means for measuring the volume of the composition delivered thereto, the elapsed time $t_e$ of the pilot filtering cycle and the pressure of the composition fed to the pilot filter press, said first and second electronic signal producing means including two position switching means interconnected with the measuring means of the first said filter press and said pilot filter press, means for actuating said switching means prior to the start of the filtering operation to connect said measuring means of said pilot filter press to said first and second electronic signal producing means to compute the quantity K for the pilot filter press upon the attainment of approximately 90% of its terminal pressure to insure proper operation of the first said filter press prior to its attainment of 90% of its terminal pressure and upon the attainment of 90% of the terminal pressure in the first said filter press actuating said switching means to connect said first and second electronic signal generating means to said measuring means of the first said filter press until the filtering cycle of the last said filter press is completed.

11. In the filtration of a liquid-solids composition utilizing a cyclically operated filter press of a known volume having an inlet and outlet and a recommended terminal pressure of the composition fed to said inlet, the method of determining the quality of the cake formed in said filter press comprising the steps of measuring the volume of the composition delivered to said filter press, the concentration of particulates contained in said composition and the density of said particulates, determining the percent of the dry solids CS per unit mass of cake contained in the volume of said filter press, measuring the elapsed time $t_e$ of the filtering cycle, measuring the pressure of composition fed to said filter, determining a quantity K representing the rate at which the liquid will permeate the cake being formed according to the following equation when said pressure is equal to at least 90% of the recommended terminal pressure:

$$K = CS^2/t_e^x,$$

where $x = 0.54$ to $0.8$
modifying the composition to achieve a value of K previously determined experimentally to effect the desired quality of cake in said filter within a predetermined period of time and continuing the cycle of operation until the cake approximately fills said filter.

* * * * *